US008599533B2

(12) United States Patent
Haight et al.

(10) Patent No.: US 8,599,533 B2
(45) Date of Patent: Dec. 3, 2013

(54) NANOSTRUCTURE ELECTRODE FOR PSEUDOCAPACITIVE ENERGY STORAGE

(75) Inventors: Richard A. Haight, Mahopac, NY (US); Stephen M. Rossnagel, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 12/876,441

(22) Filed: Sep. 7, 2010

(65) Prior Publication Data

US 2012/0057273 A1    Mar. 8, 2012

(51) Int. Cl.
*H01G 9/155*    (2011.01)
*H01G 9/00*    (2006.01)

(52) U.S. Cl.
USPC .......................................... 361/502; 361/503

(58) Field of Classification Search
USPC ................................................. 361/502, 503
See application file for complete search history.

(56) References Cited

U.S. PATENT DOCUMENTS

| 2,800,616 | A |   | 7/1957  | Becker           |         |
|-----------|---|---|---------|------------------|---------|
| 3,652,902 | A | * | 3/1972  | Hart et al.      | 361/502 |
| 6,129,901 | A |   | 10/2000 | Moskovits et al. |         |
| 6,205,016 | B1|   | 3/2001  | Niu              |         |
| 6,231,744 | B1|   | 5/2001  | Ying et al.      |         |
| 7,084,002 | B2|   | 8/2006  | Kim et al.       |         |
| 7,623,340 | B1|   | 11/2009 | Song et al.      |         |
| 7,625,673 | B2|   | 12/2009 | Kudo et al.      |         |
| 7,713,660 | B2|   | 5/2010  | Kim et al.       |         |

| 2005/0041374 | A1 | * | 2/2005  | Seitz et al.    | 361/516 |
|--------------|----|---|---------|-----------------|---------|
| 2007/0045692 | A1 |   | 3/2007  | Kim et al.      |         |
| 2008/0316677 | A1 |   | 12/2008 | Gunderman et al.|         |
| 2009/0214942 | A1 | * | 8/2009  | Frank et al.    | 429/122 |
| 2010/0171081 | A1 | * | 7/2010  | Gunderman et al.| 252/501.1 |
| 2010/0266897 | A1 | * | 10/2010 | Lee et al.      | 429/219 |

FOREIGN PATENT DOCUMENTS

WO    2007/125282 A2    11/2007

OTHER PUBLICATIONS

Hu et al., Design and Tailoring of the Nanotubular Array Architecture of Hydrous RuO for Next Generation Supercapacitors, 2006, Nano Lett., 6 (12), 2690-2695.*

(Continued)

*Primary Examiner* — Eric Thomas
(74) *Attorney, Agent, or Firm* — Scully, Scott, Murphy & Presser, P.C.; Vazken Alexanian

(57) ABSTRACT

A nanoporous templating substrate, which is an anodically oxidized alumina (AAO) substrate, is employed to form a pseudocapacitor having high stored energy density. A pseudocapacitive material is deposited conformally along the sidewalls of the AAO substrate by atomic layer deposition, chemical vapor deposition), and/or electrochemical deposition employing a nucleation layer. The thickness of the pseudocapacitive material on the walls can be precisely controlled in the deposition process. The AAO is etched to form an array of nanotubes of the PC material that are cylindrical and structurally robust with cavities therein. Because the AAO substrate that acts as scaffolding is removed, only the active PC material is left behind, thereby maximizing the energy per mass. In addition, nanotubes may be de-anchored from a substrate so that free-standing nanotubes having randomized orientations may be deposited on a conductive substrate to form an electrode of a pseudocapacitor.

20 Claims, 12 Drawing Sheets

(56) References Cited

OTHER PUBLICATIONS

Kim, H. et al., "Synthesis and Characterization of MnO2-Based Mixed Oxides as Supercapacitors" Journal of the Electrochemical Society (2003) pp. D56-D62, vol. 150(3).

Fischer, A.E. et al., "Incorporation of Homogeneous, Nanoscale MnO2 within Ultraporous Carbon Structures via Self-Limiting Electroless Deposition: Implications for Electrochemical Capacitors" Nano Letters (2007) pp. 281-286, vol. 7(2).

Inoue, R. et al., "Pseudocapacitive Properties of Vertically Aligned Multilayered Manganese Oxide" Electrochemical and Solid-State Letters (2009) pp. A203-A206, vol. 12(11).

Chmiola, J. et al., "Anomalous Increase in Carbon Capacitance at Pore Sizes Less Than 1 Nanometer" Science (2006) pp. 1760-1763, vol. 313.

Stewart, M.P. et al., "Direct Covalent Grafting of Conjugated Molecules onto Si, GaAs, and Pd Surfaces from Aryldiazonium Salts" Journal of American Chemical Society (2004) pp. 370-378, vol. 126(1).

Kim, H. et al., "A Mathematical Model of Oxide/Carbon Composite Electrode for Supercapacitors" (2003) pp. A1153-A1160, vol. 150(9).

International Search Report dated Nov. 29, 2011, issued in corresponding International Application No. PCT/US2011/044643.

* cited by examiner

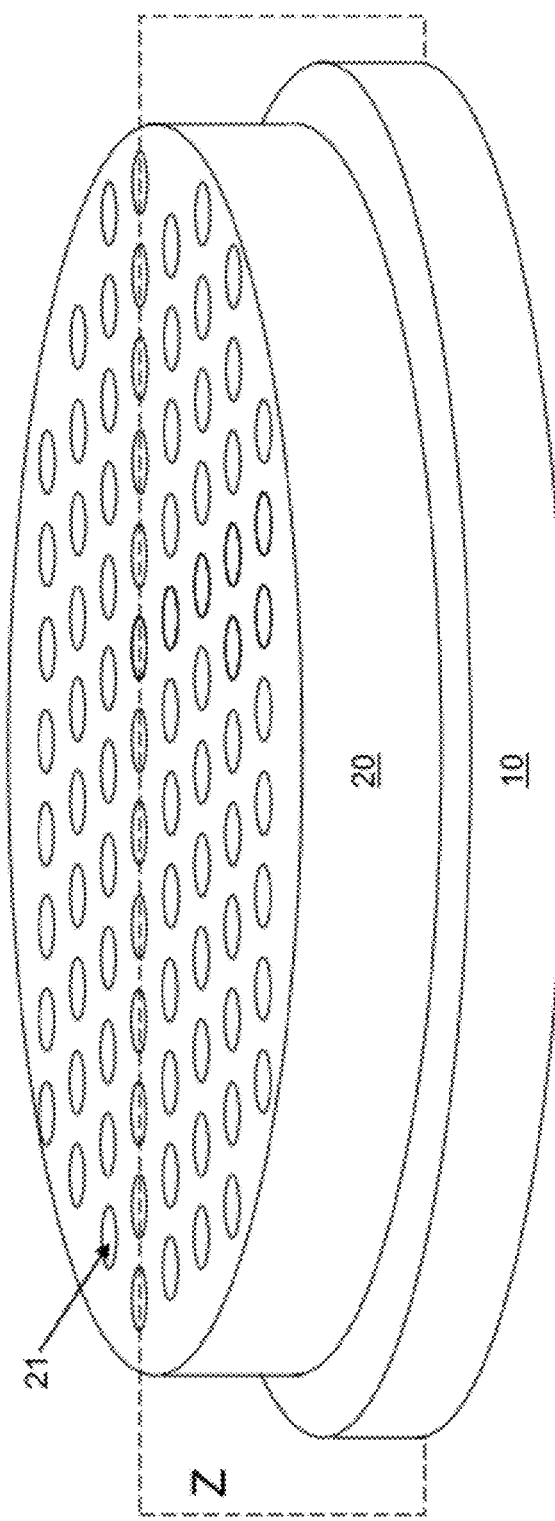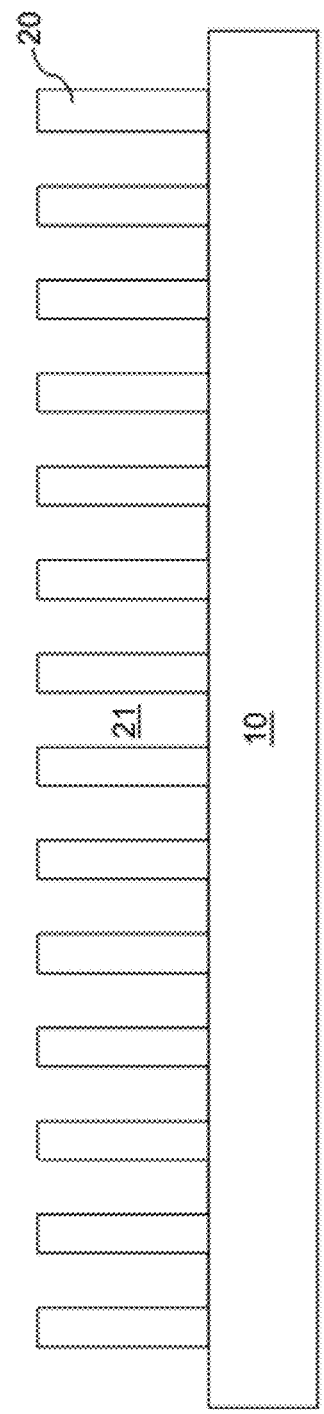
FIG. 3
FIG. 4

NANOSTRUCTURE ELECTRODE FOR PSEUDOCAPACITIVE ENERGY STORAGE

BACKGROUND

The present disclosure relates to an energy storage device, and particularly to an energy storage device including at least one nanostructure electrode having a large surface area of a pseudocapacitive material for pseudocapacitive energy storage, and methods of manufacturing the same.

Ultracapacitors or electrochemical double layer capacitors (EDLC's) provide the highest energy density among commercially available devices employing capacitive energy storage. Although such EDLC's are capable of operation at considerably higher power than a battery, the energy density of even high performance EDLC's is lower than the energy density of high performance batteries by a factor of 10~20. A traditional ultracapacitor consists of two electrodes that are fabricated from highly porous activated carbon sheets that provide very large surface area, which is typically on the order of 1000 square meters/gram of material. These porous activated carbon-based electrodes are immersed in an electrolyte. When a voltage is applied across a porous activated carbon-based electrode and the electrolyte, energy is stored in the electric field set up in the double layer formed between the carbon surface and the electrolyte. No charge is transferred across the interface between the porous activated carbon-based electrode and the electrolyte.

The capacitance of an EDLC is thus limited by the area of the surface of the activated carbon sheets. Increasing this area is not only difficult, but also produces only minimal increases in stored energy. To date, this constraint has limited the energy density of an ultracapacitor to below 10 Wh/kg. This value has not changed appreciably in more than 10 years.

Another means of increasing the energy density is to store charge through redox (reduction/oxidation) chemistries at the surface of certain metals and metal oxides. This Faradaic process involves the actual transfer of electrical charges between the surface of the metal oxide and the electrolyte. The change in the stored electrical charges varies continuously as a function of an externally applied voltage in a manner similar to a conventional capacitor. Thus, this phenomenon is called pseudocapacitance. Pseudocapacitive energy storage refers to the method of energy storage employing the phenomenon of pseudocapacitance.

While pseudocapacitance (PC) can store about ten times more charge than a standard EDLC in theory, there are no commercial pseudocapacitors that have demonstrated anything remotely approaching this energy density level to this date. The problem can be found in the microscopic nature of the electrode—the electrode must have a very large surface area in order to be able to take advantage of the potential for high energy density. Further, a proper PC material and electrolyte or ionic liquid is required as well. Still further, a high energy density pseudocapacitor must be constructed of lightweight, low cost, non-toxic materials in order to be commercially viable. So far, all known methods for creating a PC electrode involve coating of a PC material onto an inactive substrate, which only adds mass without contributing to energy storage and reduces the stored energy density.

U.S. Pat. No. 7,084,002 to Kim et al. describes a similar templating method employing sputtering of a metal onto the anodized aluminum oxide template, a method that will not work for the ultrahigh aspect ratios of the nanoscale pores required for the electrode to work properly and to its highest energy storage potential due to the directional nature of the deposition process and shadowing effect of a deposited material upon any structure underneath. In addition, U.S. Pat. No. 7,084,002 requires electrochemical deposition of appropriate metal oxides, which cannot not occur on insulating aluminum oxide templates. Similarly, U.S. Pat. No. 7,713,660 to Kim et al. describes wet chemical processes that cannot achieve the wall thickness control or arrayed attachment to a conductive substrate. Further, capillary and surface tension effects limit the tube diameters to dimensions greater than hundreds of nanometers under this method.

BRIEF SUMMARY

A nanoporous templating substrate, which is an anodically oxidized alumina (AAO) substrate, is employed to form a pseudocapacitor having high stored energy density. A pseudocapacitive material is deposited conformally along the sidewalls of the AAO substrate by atomic layer deposition, chemical vapor deposition, and/or electrochemical deposition employing a nucleation layer. The thickness of the pseudocapacitive material on the walls can be precisely controlled in the deposition process. The AAO is etched to form an array of nanotubes of the PC material that are cylindrical and structurally robust with cavities therein. Because the AAO substrate that acts as scaffolding is removed, only the active PC material is left behind, thereby maximizing the energy per mass. In addition, nanotubes may be de-anchored from a substrate so that free-standing nanotubes having randomized orientations may be deposited on a conductive substrate to form an electrode of a pseudocapacitor.

According to an aspect of the present disclosure, an energy storage device includes an electrode, which has a plurality of pseudocapacitive nanocylinders located on a conductive substrate. Each pseudocapacitive nanocylinder includes a pseudocapacitive material and has a cavity therein.

According to another aspect of the present disclosure, a method of manufacturing a plurality of pseudocapacitive nanocylinders includes: depositing a pseudocapacitive material layer on an anodized aluminum oxide substrate having a plurality of holes therein; exposing surfaces of the anodized aluminum oxide substrate; and removing the anodized aluminum oxide substrate. A plurality of pseudocapacitive nanocylinders is formed from remaining portions of the pseudocapacitive material layer.

BRIEF DESCRIPTION OF THE SEVERAL VIEWS OF THE DRAWINGS

FIG. 3 is a bird's eye view of a stack of an AAO substrate and a conductive substrate, in which the AAO substrate includes an array of cylindrical holes, according to a first embodiment of the present disclosure FIG. 4 is a vertical cross-sectional view of the stack of the AAO substrate and the conductive substrate of FIG. 3 along the plane Z.

DETAILED DESCRIPTION

Figure 1:
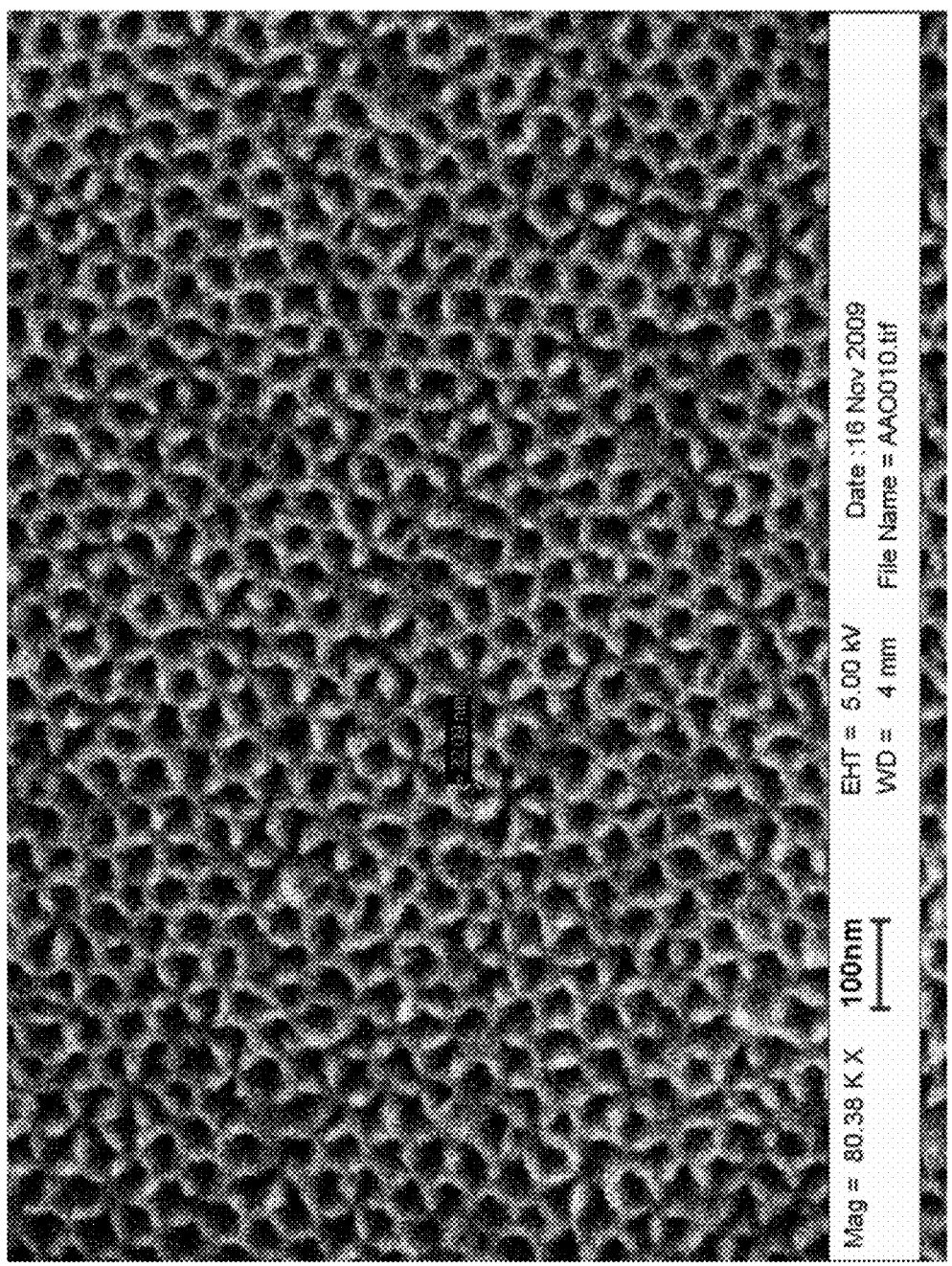
FIG. 1 is a top-down scanning electron micrograph (SEM) of the surface of an anodized aluminum oxide (AAO) substrate, coated with TaN via atomic layer deposition, having a regular hexagonal array of ~30 nm diameter pores.

As stated above, the present disclosure relates to an energy storage device including at least one nanostructure electrode having a large surface area of a pseudocapacitive material for pseudocapacitive energy storage, and methods of manufacturing the same, which are now described in detail with accompanying figures. It is noted that like reference numerals refer to like elements across different embodiments.

Referring to FIG. 1, a top-down scanning electron micrograph (SEM) of the surface of an anodized aluminum oxide (AAO) substrate shows a regular hexagonal array of ~60 nm diameter pores. It is known in the art that acidic anodizing solutions produce pores in an anodized coating of aluminum. Examples of acids that can be employed to anodize aluminum include, but are not limited to, phosphoric acid and sulfuric acid. The pore size and the pitch depend on the type of anodizing carried out, the anodization temperature, and the forming voltage. The pores can be about 10 nm to 200 nm in diameter, and the wall thickness (the distance between adjacent pores) can be between 10 nm and 200 nm, although lesser and greater diameters and wall thicknesses may be obtainable under suitable anodization conditions. The pore length can be orders of magnitude longer than the pore diameter, and can be as much as about 25,000 times the diameter.

Figure 2:
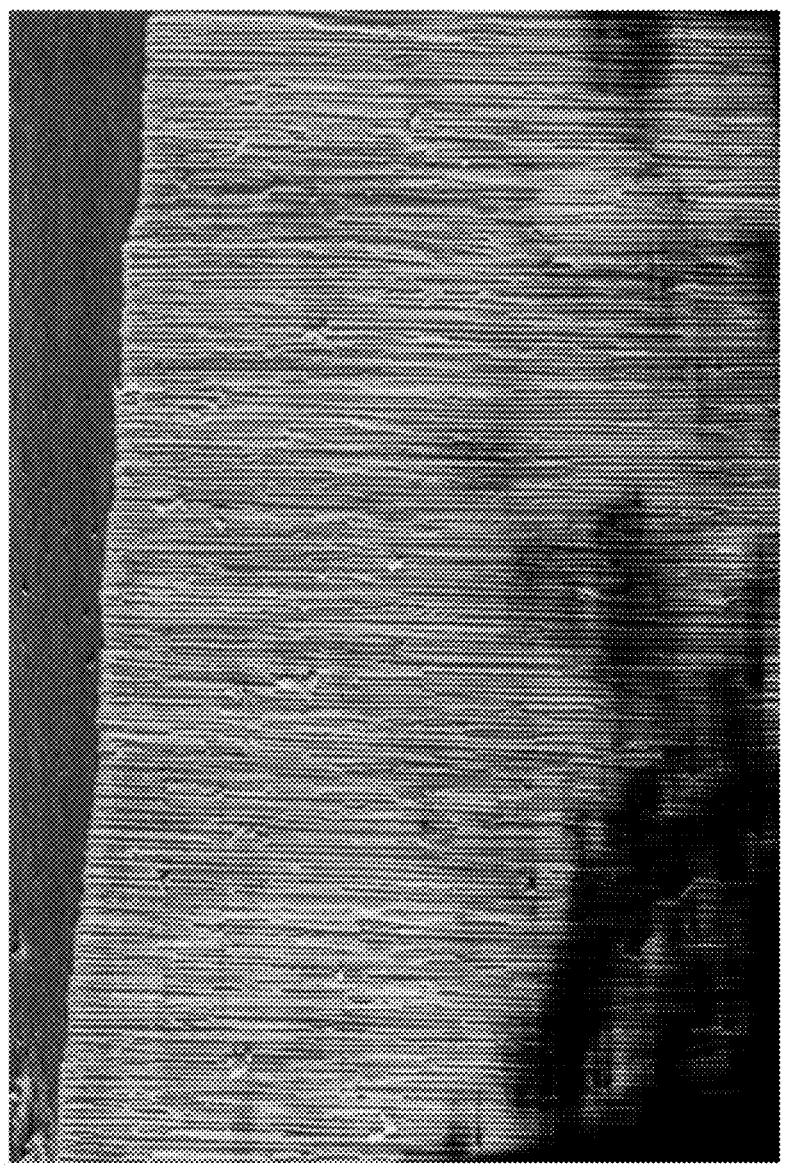
FIG. 2 is a scanning electron micrograph (SEM) showing a cross-sectional view of a broken piece of AAO substrate that has a coating of TaN grown via ALD.

Referring to FIG. 2, a scanning electron micrograph (SEM) shows a cross-sectional view of a broken piece of AAO substrate that has a coating of TaN layer grown by atomic layer deposition (ALD). The TaN layer prevents charge accumulation and/or arcing on the insulating material of the AAO substrate. The vertical cylindrical pores extend through the entire cross-section of the AAO substrate, and the aspect ratio, i.e., the ratio of the length of the pore to the diameter of the pore, can be up to 25,000 or more as discussed above.

Referring FIGS. 3 and 4, a first exemplary structure according to a first embodiment of the present disclosure is shown in a bird's eye view in FIG. 3 and in a vertical cross-sectional view in FIG. 4. The Z plane of FIG. 3 is the vertical cross-sectional plane of FIG. 4.

The first exemplary structure includes a stack of a conductive substrate 10 and an anodized aluminum oxide (AAO) substrate 20. The AAO substrate 20 is a sheet of aluminum foil that is anodically oxidized to be converted into aluminum oxide layer that includes a self-assembled array of vertical pores therein. An AAO substrate 20 can be formed employing methods known in the art. The AAO substrate 20 includes an array of "nanopores" 21, which refers to pores having a diameter less than 1 micron. The diameter of individual nanopores 21 and the pitch of the array of nanopores 21 can be controlled by altering anodization parameters.

Typically, the diameter of each nanopore 21 is from 10 nm to 200 nm, although lesser and greater diameters may be practicable depending on optimization of process conditions in the future. The thickness of the AAO substrate 20 is at least 50 times the diameter of the nanopores 21, and can be up to, or exceed, 25,000 times the diameter of the nanopores 21. Typically, the thickness of the AAO substrate 20 is from 10 microns to 5 mm, although lesser and greater thicknesses can also be employed. Each nanopore 21 is a cylindrical hole extending from the topmost planar surface of the AAO substrate 20 to the bottommost surface of the AAO substrate 20 that contacts a planar topmost surface of the conductive substrate 10. Thus, the AAO substrate 20 includes a plurality of holes therein, which are a plurality of nanopores 21 therein. The plurality of holes may form a two-dimensional periodic array such as a hexagonal array.

The AAO substrate 20 is placed on a conductive substrate 10, which includes a conductive material such as elemental metal, an intermetallic alloy of at least two elemental metals, a conductive oxide of a metal, a conductive nitride of a metal, a heavily doped semiconductor material, or an alloy or a stack thereof. The material of the conductive substrate is selected to withstand an etch process that is subsequently employed to remove the AAO substrate 20 without loss of structural integrity. The thickness of the AAO substrate 20 can be from 50 microns to 1 mm, although lesser and greater thicknesses can also be employed. The bottommost surface of the AAO substrate 20 contacts a planar topmost surface of the conductive substrate 10. While the AAO substrate 20 and the conductive substrate 10 maintains a planar interface at a microscopic scale, the assembly of the AAO substrate 20 and the conductive substrate 10 can be bent on a macroscopic scale as needed. Preferably, the conductive substrate 10 is a thin lightweight substrate in order to maximize stored energy density per total mass of an energy storage device.

Figure 5:
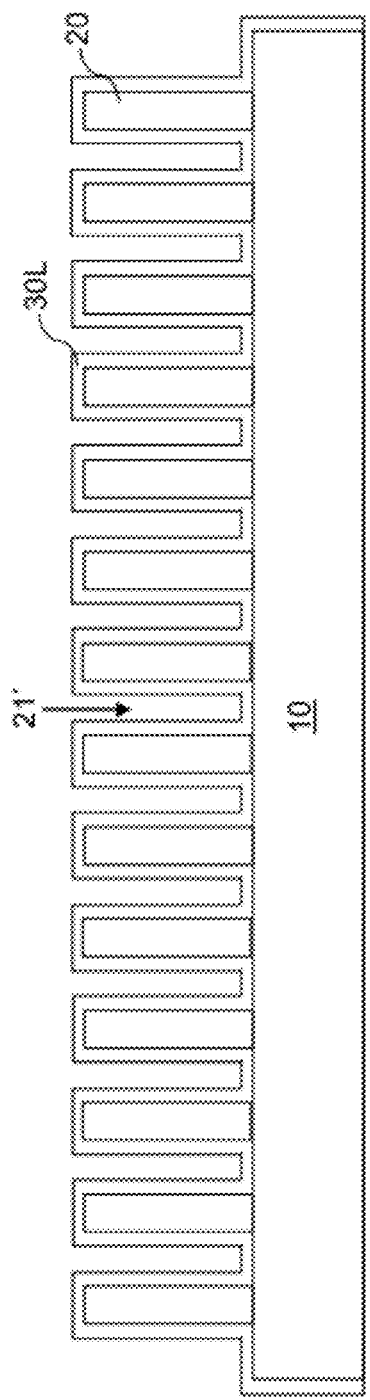
FIG. 5 is a vertical cross-sectional view of the stack of the AAO substrate and the conductive substrate after deposition of a pseudocapacitive material layer according to the first embodiment of the present disclosure.

Referring to FIG. 5, a pseudocapacitive material layer 30L is conformally deposited on the stack of the AAO substrate and the conductive substrate after deposition of according to the first embodiment of the present disclosure. As used herein, a "pseudocapacitive material" refers to a material that can store energy through a reversible reduction/oxidation reaction on a surface thereof. Pseudocapacitive materials include some metals and some metal oxides. The phenomenon of a pseudocapacitive material storing and releasing energy through the reversible reduction/oxidation reaction is referred to as "pseudocapacitance." Pseudocapacitive materials include, but are not limited to, manganese oxide ($MnO_2$), ruthenium oxide ($RuO_2$), nickel oxide (NiO), and a combination thereof.

Typically, the extremely high aspect ratio of the nanopores 21 (which is at least 50) necessitates the use of atomic layer deposition (ALD) in order to produce a conformal coating of a pseudocapacitive material on the sidewalls of the nanopores 21 in the AAO substrate 10. The AAO substrate 20 functions as a template for deposition of the pseudocapacitive material layer 30L.

In atomic layer deposition, a monolayer of a first material is deposited in a self-limiting reaction that saturates upon formation of the monolayer of the first material by flowing a first reactant into a deposition chamber. After removing the first reactant, a monolayer of a second material is deposited in another self-limiting reaction that saturates upon formation of the monolayer of the second material by flowing a second reactant into the deposition chamber. The first reactant and the second reactant are flowed into the same deposition chamber alternately with a pumping period between each round of deposition of a monolayer. In the case of a pseudocapacitive material in the form of a metal oxide, a metal precursor is deposited in a self-limiting reaction that saturates upon formation of the monolayer of metal atoms by flowing metal-containing reactant into a deposition chamber. After removing the metal-containing reactant, a monolayer of oxygen is deposited in a self-limiting reaction that saturates upon formation of the monolayer of oxygen atoms by flowing oxygen gas into the deposition chamber. The oxygen is then pumped out from the deposition chamber. The steps of flowing the metal-containing reactant, pumping of the metal-containing reactant, flowing oxygen gas, and pumping the oxygen gas are repeatedly cycled to deposit a metal oxide layer exhibiting the characteristics of pseudocapacitance, i.e., a "pseudocapacitive" metal oxide layer. The pseudocapacitive material layer 30L is deposited on the exposed surfaces of the conductive substrate 10 at the bottom of each nanopore 21.

The thickness of the pseudocapacitive material layer 30L can be precisely controlled with atomic level accuracy. Further, the thickness of the pseudocapacitive material layer 30L is identical throughout the entirety of the pseudocapacitive material layer 30L with atomic precision due to the self-limiting nature of the reactions in the ALD process. The thickness of the pseudocapacitive material layer 30L is selected to be less than one half of the diameter of the nanopores 21 so that a cavity 21' having a lesser diameter than the diameter of the nanopores 21 is present within each recessed portion of the pseudocapacitive material layer 30L. The entirety of the pseudocapacitive material layer 30L is contiguous at this step. As such the inner diameter of the nanotube can be exquisitely controlled down to, and below, 1 nanometer where substantial increases in capacitance have been reported. See, for example, J. Chmiola, G. Yushin, Y. Gogotsi, C. Portet, P. Simon, and P. L. Taberna, "Anomalous increase in carbon capacitance at pore sizes less than 1 nanometer," Science 313, 1760 (2006).

In general, atomic layer deposition is required to achieve the required high level of conformity and overall geometrical control in order to form a contiguous pseudocapacitive material layer 30L that extends to the bottom portions of the nanopores 21. Attempts to employ electroplating faces two problems. The first problem is that the AAO substrate 20 cannot be employed as an electrode for electroplating because the AAO substrate 20 is an insulator. In order to employ electroplating, the exposed surfaces of the AAO substrate 20 must be converted to a conductor surface by first forming a uniform coating of a conductive material. Thus, atomic layer deposition is required anyway even to form a conductive seed layer for the purpose of employing electroplating. The second problem is that the diameters of the nanopores 21 are too small and the aspect ratio of the nanopores 21 is too high to employ electroplating even if a conductive seed layer were to be successfully provided. The plating liquids and the electric fields cannot penetrate to the lower portion of the nanopores 21 because of the small diameters of the nanopores 21 and the high aspect ratio (at least 10, and typically greater than 50) of the nanopores 21, thereby rendering electroplating impracticable.

Chemical vapor deposition (CVD) is a generic gas phase process in which cracking of the precursor occurs on a heated surface. While the method of chemical vapor deposition could in principle work, chemical vapor deposition does not possess the exquisite thickness control that atomic layer deposition provides. Currently, no chemical vapor deposition process is available that can reliably reach to the bottom of nanopores 21 given the small diameter of the nanopores 21 and the high aspect ratio of each nanopore 21. In practice, atomic layer deposition is currently the only viable method of forming a conformal layer of a pseudocapacitive material that contacts the bottommost portions of the nanopores 21. The use of atomic layer deposition provides the capability to coat the sidewalls of the nanopores 21 and to form a single contiguous pseudocapacitive material layer 30L given the length, diameter, and pitch of the array of the nanopores 21. The thickness of the pseudocapacitive material layer 30L can be from 1 nm to 75 nm, and typically from 3 nm to 30 nm, although lesser and greater thicknesses can also be employed.

Figure 6:
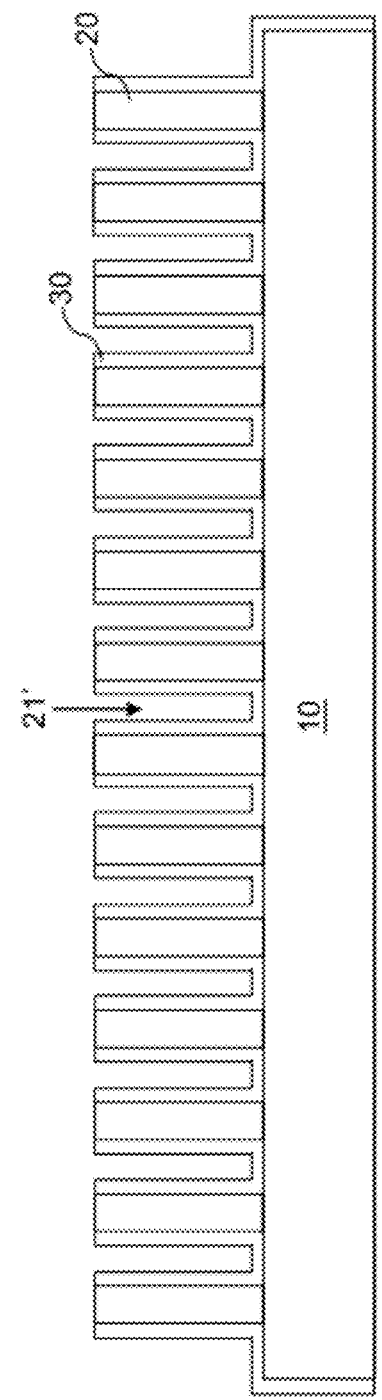
FIG. 6 is a vertical cross-sectional view of the stack of the AAO substrate and the conductive substrate after removal of top portions of the pseudocapacitive material layer according to the first embodiment of the present disclosure.

Referring to FIG. 6, the top surfaces of the AAO substrate 20 are exposed by removing distal planar portions of the pseudocapacitive material layer 21. The distal portions of the pseudocapacitive material layer 21 refer to the contiguous planar portions of the pseudocapacitive material layer 21 located on and above the topmost surfaces of the AAO substrate 20. The distal portions of the pseudocapacitive material layer 30L can be removed, for example, by chemical mechanical planarization or by an anisotropic etch such as a reactive ion etch. If chemical mechanical planarization is employed, the distal portions of the pseudocapacitive material layer 30L can be removed by polishing, in which chemical slurry is employed as needed. If an anisotropic etch is employed, the etchants in a gas phase impinges on the distal portions of the pseudocapacitive material layer 30L with directionality, i.e., along the vertical direction. Typically, the etchants do not etch the bottommost portions of the pseudocapacitive material layer 30L that contact the conductive substrate 10 inside the cavities 21' due to the high aspect ratio of the cavities 21', which is greater than the aspect ratio of unfilled nanopores 21. (See FIG. 4.)

Figure 7:
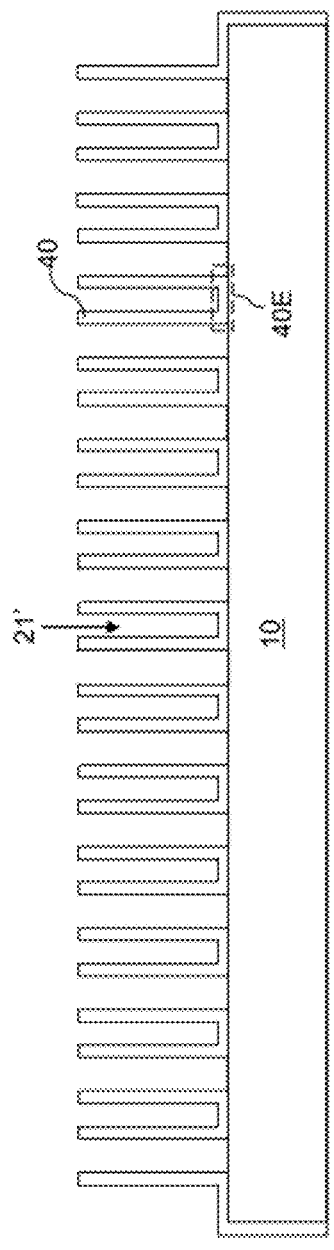
FIG. 7 is a vertical cross-sectional view of the conductive substrate and an array of pseudocapacitive nanocylinders after removal of the AAO substrate according to the first embodiment of the present disclosure.
Figure 8:
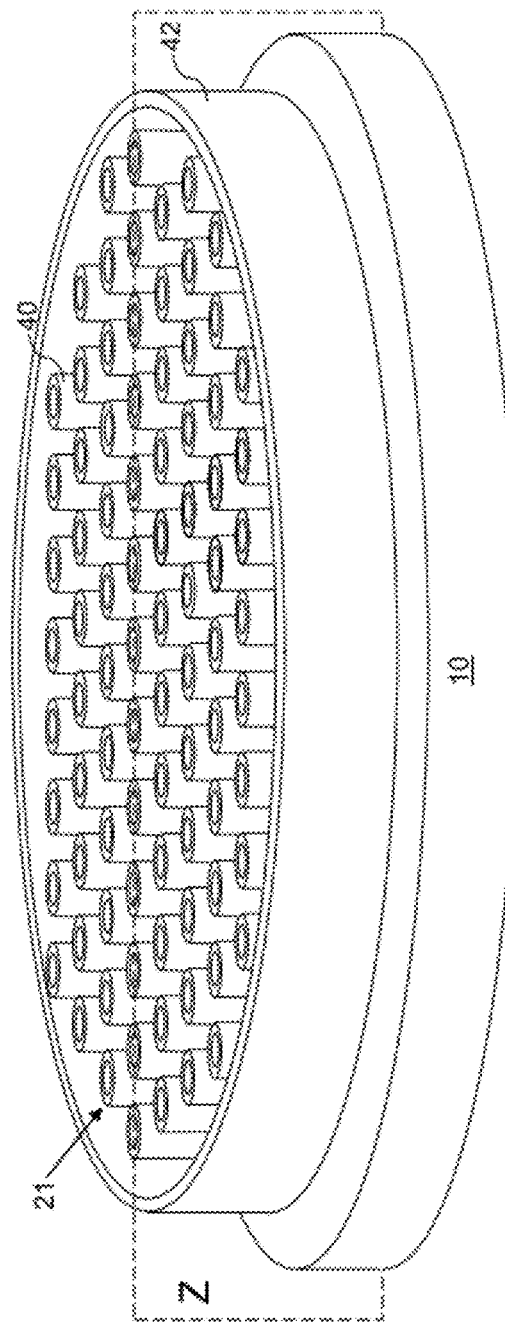
FIG. 8 is a bird's eye view of the conductive substrate and the array of pseudocapacitive nanocylinders of FIG. 7.

Referring to FIGS. 7 and 8, a plurality of pseudocapacitive "nanocylinders" 40 is formed by removing the AAO substrate 20. As used herein, a "nanocylinder" refers to a structure including a cylindrical tube having an outer diameter that does not exceed 1 micron. Typically, the outer diameter of a nanocylinders is from 10 nm to 200 nm, although lesser and greater outer diameters (less than 1 micron) can also be employed. The alumina, i.e., the aluminum oxide, in the AAO substrate can be etched away, for example, by utilizing standard wet etching methods such as immersion in aqueous chromic acid. The result is the plurality of pseudocapacitive nanocylinders 40 is formed as an array of pseudocapacitive nanocylinders 40, which are nanotubes of the pseudocapacitive materials that are structurally robust. In other words, the plurality of pseudocapacitive nanocylinders 40 is formed from remaining portions of the pseudocapacitive material layer 30L after removal of the AAO substrate 20. Prior to removal, the AAO substrate 20 functions as scaffolding for the two-dimensional periodic array of pseudocapacitive nanocylinders 40. Upon removal of the AAO substrate 20, only an assembly of the conductive substrate 10, the array of pseudocapacitive nanocylinders 40, and an outer pseudocapacitive wall 42 is left.

The advantage of removal of the AAO substrate 20 is manifold. First, the removal of the AAO substrate 20 forms a two-dimensional ordered array of pseudocapacitive nanocylinders 40 that can be employed as parts of an electrode having an exceptionally high specific area. A "specific area" refers to a surface area per unit mass. For example, a two-dimensional ordered array of pseudocapacitive nanocylinders 40 can have an areal density up to $10^{16}/m^2$ and a specific area about 500 $m^2/g$. The specific area could be two to three times higher depending on the specific morphology of the sidewalls of the pseudocapacitive nanocylinders 40, e.g., if the surfaces of the pseudocapacitive nanocylinders 40 is roughened or textured.

Second, the removal of the AAO substrate 20 reduces the total mass of the first exemplary structure by reducing the parasitic mass, i.e., the total mass of materials that do not contribute to charge storage. In other words, the energy to mass ratio of the first exemplary structure is enhanced by completely removing all materials, i.e., the alumina in the AAO substrate 20, that do not contribute to the storage of energy. The reduced mass of the assembly (10, 40, 42), which includes all remaining portions of first exemplary structure at this step, can be subsequently advantageously employed to provide a lightweight electrode including the assembly of the conductive substrate 10 and the array of pseudocapacitive nanocylinders 40.

Third, the removal of the AAO substrate 20 more than doubles the total surface area of the pseudocapacitive material, thereby doubling the specific capacitance, i.e. the capacitance per unit mass. Because the exposed outer sidewall surfaces of the cylinder portions of the pseudocapacitive nanocylinders 40 add to the total surface area, the total capacitance of the assembly (10, 40, 42) increases correspondingly. When the assembly (10, 40, 42) functions as an electrode, the upper portion (40, 42) of the electrode is fully optimized to store electrical charges via Faradaic processes, i.e., via charge transfer processes that employ oxidation and reduction. In this case, the conductive substrate 10 functions as a portion of the electrode upon which the array of pseudocapacitive nanocylinders 40 is structurally affixed.

Thus, the electrode can employ a plurality of pseudocapacitive nanocylinders 40 located on a conductive substrate 10. Each pseudocapacitive nanocylinder 40 includes a pseudocapacitive material and has a cavity 21' therein. The cavity 21' in each pseudocapacitive nanocylinder 40 is not encapsulated by that pseudocapacitive nanocylinder 40, but each pseudocapacitive nanocylinder 40 has an opening at one end thereof. The opening at one end is contiguously connected to the cavity 21' in each pseudocapacitive nanocylinder 40.

Each pseudocapacitive nanocylinder 40 includes an end cap portion 40E that does not include a hole therein at an opposite end of the opening contiguously connected to the cavity 21'. The entirety of each pseudocapacitive nanocylinders 40 has a uniform (same) thickness throughout including the end cap portion 40E that includes an outer end surface. The outer end surface of each pseudocapacitive nanocylinder 40 is contiguously connected to an entire periphery of sidewalls of that pseudocapacitive nanocylinder 40. Further, the entirety of the end surface of each pseudocapacitive nanocylinder 40 contacts, and is attached to, the conductive substrate 10.

The plurality of pseudocapacitive nanocylinders 40 is formed as an array of pseudocapacitive nanocylinders 40 having sidewalls that are perpendicular to the top surface of the conductive substrate 10. Each pseudocapacitive nanocylinder 40 does not contact any other pseudocapacitive nanocylinder 40, i.e., is disjoined from other pseudocapacitive nanocylinders 40. Thus, each pseudocapacitive nanocylinder 40 is laterally spaced from any other of the plurality of capacitive nanocylinders 40.

Optionally, functional molecular groups may be coated on the outer sidewalls and/or inner sidewalls of the plurality of pseudocapacitive nanocylinders 40. The functional groups include an additional pseudocapacitive material that can add to the charge storage of the plurality of pseudocapacitive nanocylinders 40. Exemplary functional groups include, but are not limited to, polyaniline which is a conducting polymer. The coating of the functional groups can be effected in at least another atomic layer deposition process or processes that utilize vapor deposition or wet chemical deposition. The coatings on the inner sidewalls and the outer sidewalls may be performed at the same processing step or at different processing steps. For example, the coating of the inner and outer sidewalls may be performed after removal of the AAO substrate 20. Alternately, the inner sidewalls of the plurality of pseudocapacitive nanocylinders 40 can be coated prior to removal of the AAO substrate 20, and the coating of the outer sidewalls of the nanocylinders 40 can be coated after removal of the AAO substrate 20. The coating materials and the coating processes known in the art can be employed to coat the outer sidewalls and/or inner sidewalls of the plurality of pseudocapacitive nanocylinders 40. See, for example, Stewart, M. P.; Maya, F.; Kosynkin, D. V.; Dirk, S. M.; Stapleton, J. J.; McGuiness, C. L.; Allara, D. L; Tour, J. M. "Direct Covalent Grafting of Conjugated Molecules onto Si, GaAs, and Pd Surfaces from Aryldiazonium Salts," J. Am. Chem Soc. 2004, 126, 370-378.

Figure 9:
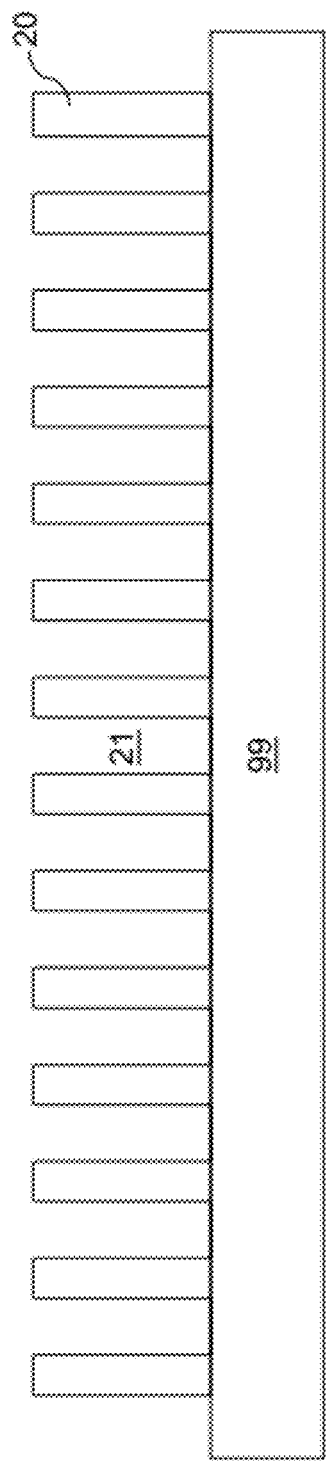
FIG. 9 is a stack of an AAO substrate and a disposable substrate, in which the AAO substrate includes an array of cylindrical holes, according to a second embodiment of the present disclosure.

Referring to FIG. 9, a second exemplary structure according to a second embodiment of the present disclosure includes a stack of an AAO substrate 20 and a disposable substrate 99. The AAO substrate 20 can be the same as in the first embodiment. The disposable substrate 99 can include a conductive material, a semiconducting material, an insulating material, or a combination thereof. The material of the disposable substrate 99 is selected for easy removal thereof selective to the material of the AAO substrate 20, i.e., without removing the material of the AAO substrate 20, by a method to be subsequently employed. The method of removal of the disposable substrate 99 can be a mechanical removal method, a chemical mechanical removal method, or a chemical removal method. The thickness of the disposable substrate 99 can be from 10 microns to 500 microns, although lesser and greater thicknesses can also be employed.

Figure 10:
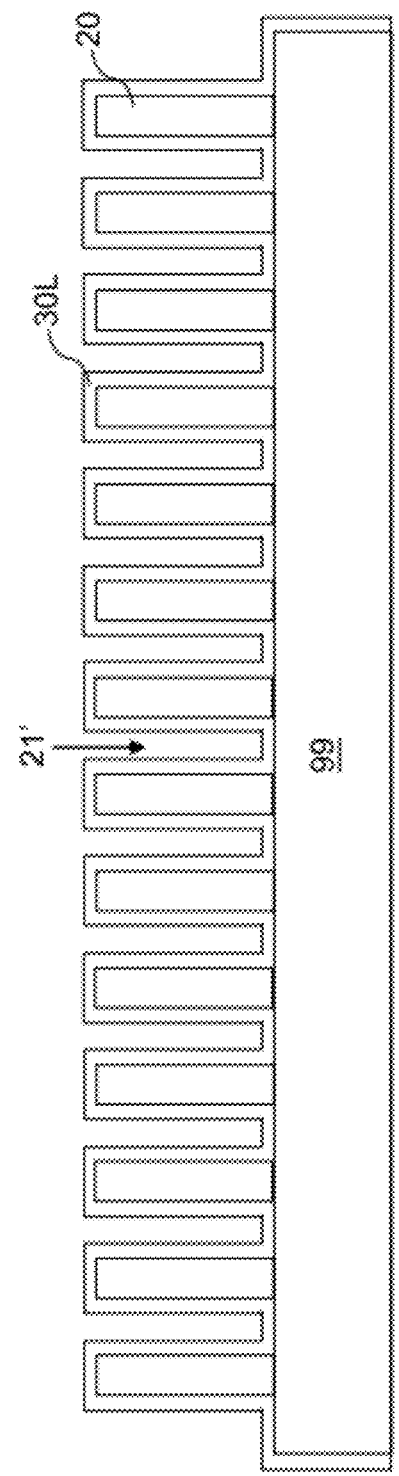
FIG. 10 is a vertical cross-sectional view of the stack of the AAO substrate and the disposable substrate after deposition of a pseudocapacitive material layer according to the second embodiment of the present disclosure.

Referring to FIG. 10, a pseudocapacitive material layer 30L is deposited on the stack of the AAO substrate 20 and the disposable substrate 99. The deposition of the pseudocapacitive material layer 30L can be effected employing the same method, i.e., atomic layer deposition, as in the first embodiment. Portions of the pseudocapacitive material layer 30L at the bottom of each cavity 21' contacts the top surface of the disposable substrate 99.

Figure 11:
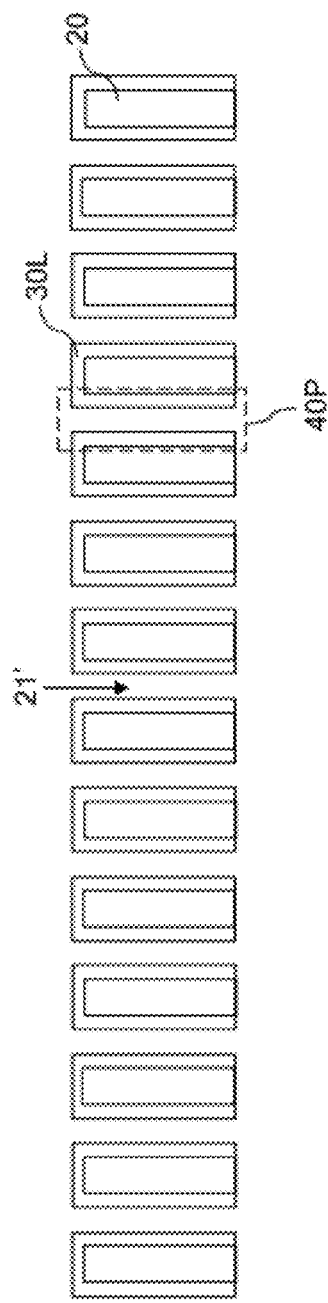
FIG. 11 is a vertical cross-sectional view of the AAO substrate and pseudocapacitive material layer after removal of a disposable substrate according to the second embodiment of the present disclosure.
Figure 12:
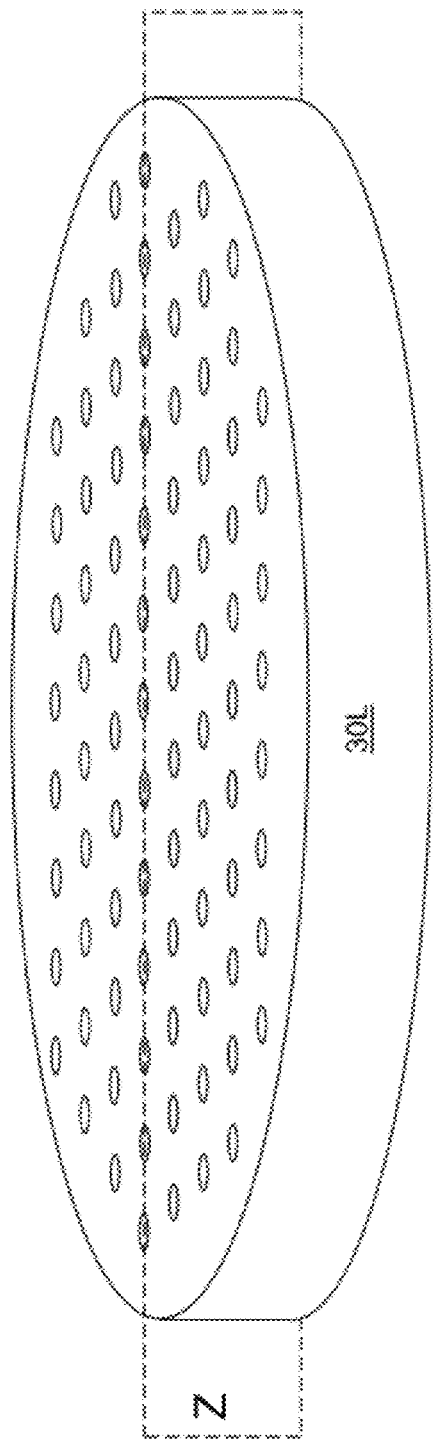
FIG. 12 is a bird's eye view of the AAO substrate and pseudocapacitive material layer of FIG. 11.

Referring to FIGS. 11 and 12, the disposable substrate 99 is removed and the bottom portions of the pseudocapacitive material layer 30L are removed to form an assembly of the AAO substrate 20 and the remaining portions of the pseudocapacitive material layer 30L. The removal of the disposable substrate 99 selective to the assembly of the AAO substrate 20 and the pseudocapacitive material layer 30L can be effected, for example, by a mechanical removal method such as grinding, a chemical mechanical removal method such as chemical mechanical planarization, a chemical removal method such as a wet etch or a dry etch, or a combination thereof. The bottommost surfaces of the pseudocapacitive material layer 30L, which are the same as the outer end surfaces of the end cap portions 40E in FIG. 7, and the bottommost surfaces of the AAO substrate are exposed once the disposable substrate 99 is removed.

Subsequently, the bottommost portions of the AAO substrate 20 and the bottommost horizontal portions of the pseudocapacitive material layer 30L that correspond to the end cap portions 40E in FIG. 7 are removed employing a non-selective removal method such as grinding or chemical mechanical planarization or a non-selective etch process. Once the bottommost horizontal portions of the pseudocapacitive material layer 30L are removed, each cavity 21' extends from the topmost surface of the assembly (20, 30L) of the AAO substrate 20 and the pseudocapacitive material layer 30L to the bottommost surface of the assembly (20, 30L) with an opening at the top and another opening at the bottom. A portion of the pseudocapacitive material layer 30L around each cavity 21' constitutes a prototypical pseudocapacitive nanocylinder 40P. The entirety of the pseudocapacitive material layer 30L is contiguous because each prototypical pseudocapacitive nanocylinder 40P is contiguously connected all other prototypical pseudocapacitive nanocylinders 40P through the upper horizontal portions of the pseudocapacitive material layer 30L located between each neighboring pair of prototypical pseudocapacitive nanocylinders 40P.

Figure 13:
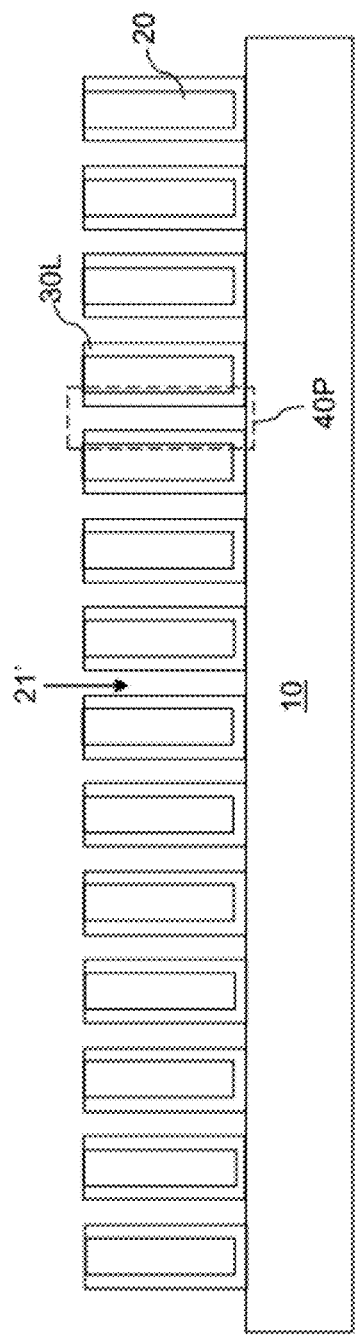
FIG. 13 is a vertical cross-sectional view of the AAO substrate and pseudocapacitive material layer after flipping over and placement on a conductive substrate according to the second embodiment of the present disclosure. The pseudocapacitive material layer may, or may not, be attached to the conductive substrate at this step.
Figure 14:
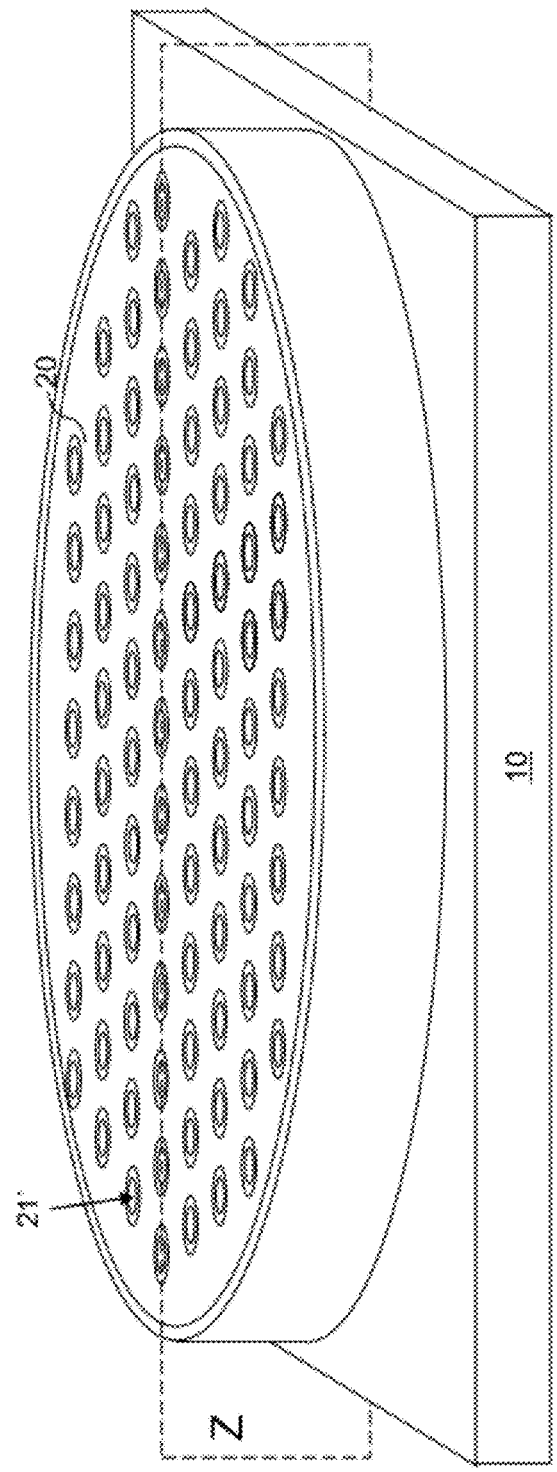
FIG. 14 is a bird's eye view of the AAO substrate and pseudocapacitive material layer and the conductive substrate of FIG. 13.

Referring to FIGS. 13 and 14, the assembly (20, 30L) of the AAO substrate 20 and the pseudocapacitive material layer 30L is flipped over. Optionally, the assembly (20, 30L) can be placed on a conductive substrate 10, which can have the same composition and thickness as the conductive substrate 10 of the first embodiment. If a conductive substrate 10 is employed, the pseudocapacitive material layer 30L may, or may not, be attached to the conductive substrate 10 at this step. In one embodiment, the bottom surfaces of the pseudocapacitive material layer 30L are permanently attached, for example, employing a conductive adhesive material (not shown). In another embodiment, the assembly 20, 30L) of the AAO substrate 20 and the pseudocapacitive material layer 30L is placed without attachment or with temporary attachment to the conductive substrate 10 to enable subsequent detachment of the pseudocapacitive material layer 30L.

Figure 15:
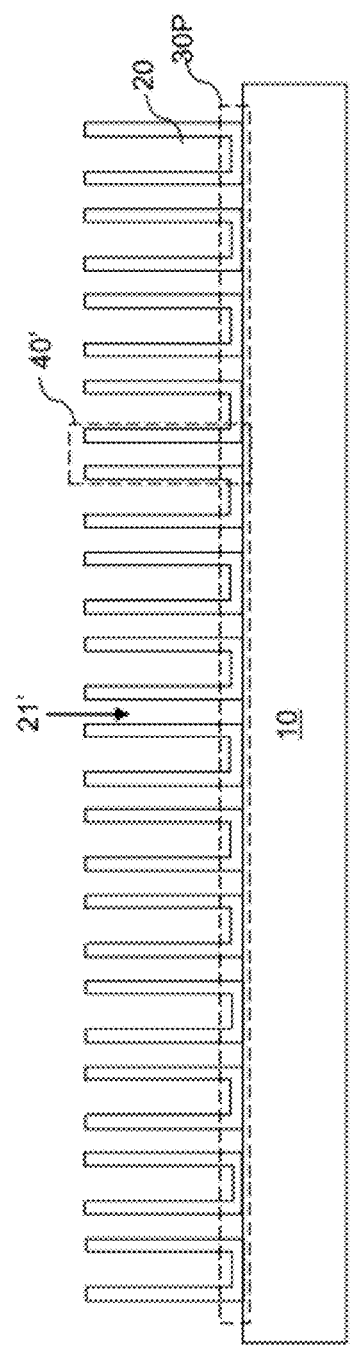
FIG. 15 is a vertical cross-sectional view of the conductive substrate and an array of pseudocapacitive nanocylinders after removal of the AAO substrate according to the second embodiment of the present disclosure.
Figure 16:
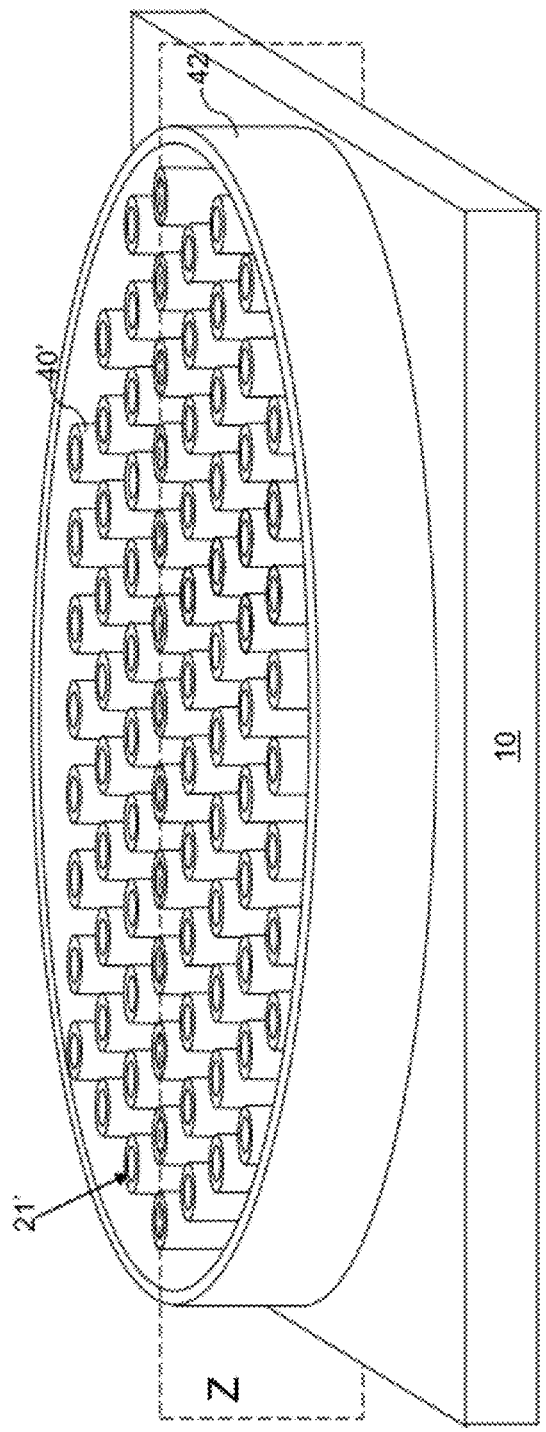
FIG. 16 is a bird's eye view of the conductive substrate and the array of pseudocapacitive nanocylinders of FIG. 15. All pseudocapacitive nanocylinders are connected to one another through a sheet of a planar pseudocapacitive material layer.

Referring to FIGS. 15 and 16, the AAO substrate 20 is removed employing the same removal process of the first embodiment corresponding to FIGS. 7 and 8. If a conductive substrate 10 is employed, the planar pseudocapacitive material layer 30P contacts the top surface of the conductive substrate 10. The outer sidewalls of the prototypical pseudocapacitive nanocylinders 40P become exposed as the AAO substrate 20 is removed, and a plurality of prototypical pseudocapacitive nanocylinders 40P become a plurality of pseudocapacitive nanocylinders 40'. All pseudocapacitive nanocylinders 40' are connected to one another through a sheet of a planar pseudocapacitive material layer 30P.

The remaining portions of the pseudocapacitive material layer 30P include the plurality of pseudocapacitive nanocylinders 40' and the planar pseudocapacitive material layer 30P, which are of integral construction and have the same thickness and composition throughout. Thus, each of the plurality of capacitive nanocylinders 40' is contiguously connected to one another through the planar pseudocapacitive material layer 30P at a bottom end of each capacitive nanocylinder 40'. The planar pseudocapacitive material layer 30P has at least as many number of holes therein as the total number of pseudocapacitive nanocylinders 40' among the plurality of pseudocapacitive nanocylinders 40'. The plurality of pseudocapacitive nanocylinders 40' is formed as an array of pseudocapacitive nanocylinders having the same two-dimensional periodicity as the nanopores in the AAO substrate 20 (which is no longer present at this step; see FIG. 9). If a conductive substrate 10 is present, the array of pseudocapacitive nanocylinders 40' has vertical sidewalls that are perpendicular to the top surface of the conductive substrate 10.

Each pseudocapacitive nanocylinder 40' includes a pseudocapacitive material and has a cavity 21' therein. The cavity 21' in each pseudocapacitive nanocylinder 40' is not encapsulated by that pseudocapacitive nanocylinder 40'. Each pseudocapacitive nanocylinder 40' has two end surfaces each including a hole therein. Each pseudocapacitive nanocylinder 40' has two openings that are located at end portions of that pseudocapacitive nanocylinder 40'. Specifically, each pseudocapacitive nanocylinder 40' has an opening at a top end, i.e., a top opening, and another opening at a bottom end, i.e., a bottom opening. Each of the top opening and the bottom opening is contiguously connected to the cavity 21. The top opening contiguously extends to the ambient. The bottom opening can also contiguously extend to the ambient if a conductive plate 10 is not employed, or can be blocked by the top surface of a conductive plate 10 if the conductive plate 10 is employed. If a conductive plate 10 is present, the sidewalls of the plurality of pseudocapacitive nanocylinders 40' are perpendicular to the top surface of the conductive substrate 10.

The second exemplary structure can be employed as an electrode of an energy storage device. In one embodiment, the electrode includes a plurality of pseudocapacitive nanocylinders 40', a planar pseudocapacitive material layer 30P, and a conductive substrate 10. In another embodiment, the electrode includes a plurality of pseudocapacitive nanocylinders 40' and a planar pseudocapacitive material layer 30P, but does not include a conductive substrate 10. Optionally, appropriate functional groups can be coated employing the same methods as in the first embodiment.

Figure 17:
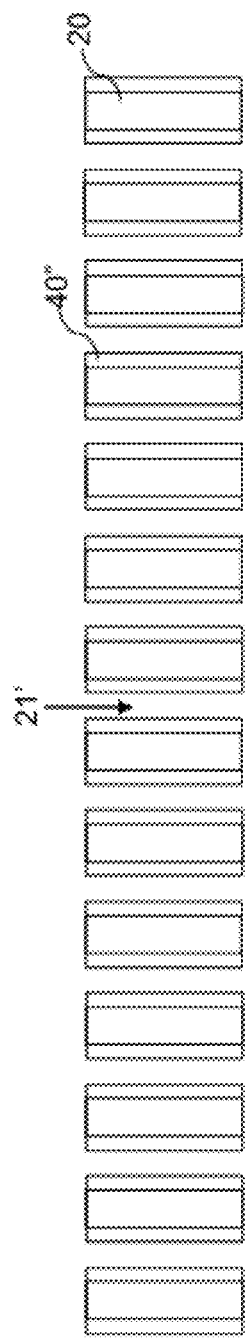
FIG. 17 is a vertical cross-sectional view of pseudocapacitive nanocylinders and the AAO substrate after removal of the top portions of the pseudocapacitive material layer of FIG. 11 according to a third embodiment of the present disclosure.
Figure 18:
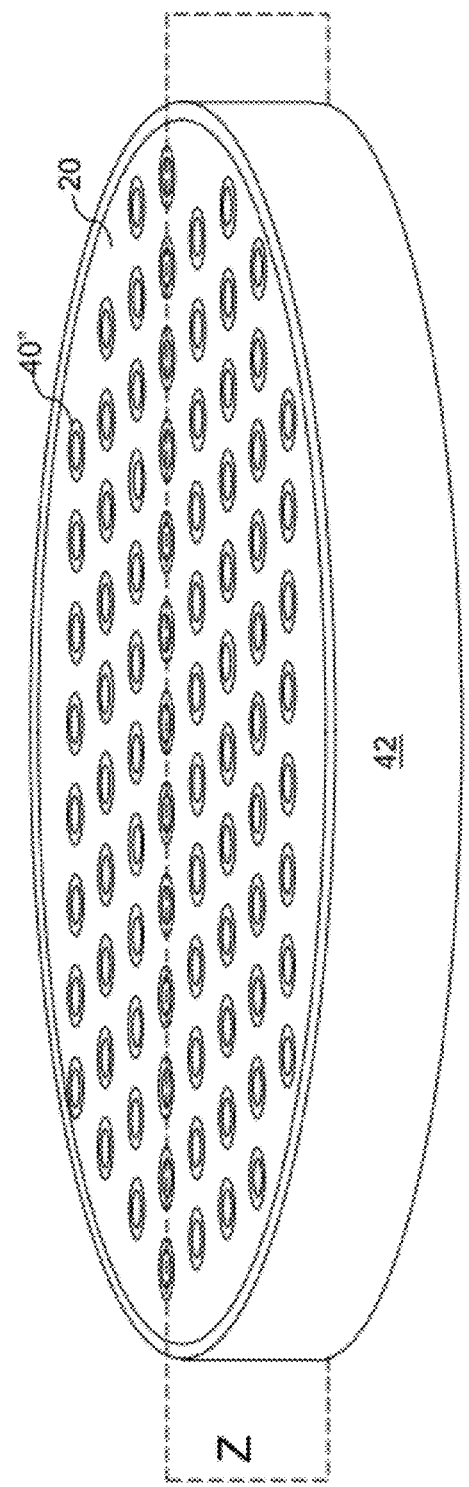
FIG. 18 is a bird's eye view of the conductive substrate and the array of pseudocapacitive nanocylinders of FIG. 17.

Referring to FIG. 17, a third exemplary structure according to a third embodiment of the present disclosure can be derived from the second exemplary structure of FIGS. 11 and 12 by removing the topmost planar portion of the pseudocapacitive material layer 30L to expose the surfaces of the AAO substrate 20. Alternately, the third exemplary structure can be derived from the second exemplary structure of FIG. 10 by first removing the topmost planar portion of the pseudocapacitive material layer 30L to expose the surfaces of the AAO substrate 20 and then removing the disposable substrate 99 and the bottom portions of the pseudocapacitive material layer 30L. An assembly (20, 40') of the AAO substrate 20 and a plurality of pseudocapacitive nanocylinders 40" is formed. Each pseudocapacitive nanocylinder 40" is a cylindrical tube that is topologically homeomorphic to a torus, and has an exposed inner vertical sidewall, an exposed top end surface with a hole therein, and an exposed bottom end surface with a hole therein. The outer vertical sidewall of each pseudocapacitive nanocylinder 40" contacts the AAO substrate 20, which holds the plurality of pseudocapacitive nanocylinders 40" in place at this step. The surfaces of the AAO substrate 10 are exposed at the top and at the bottom.

Figure 19:
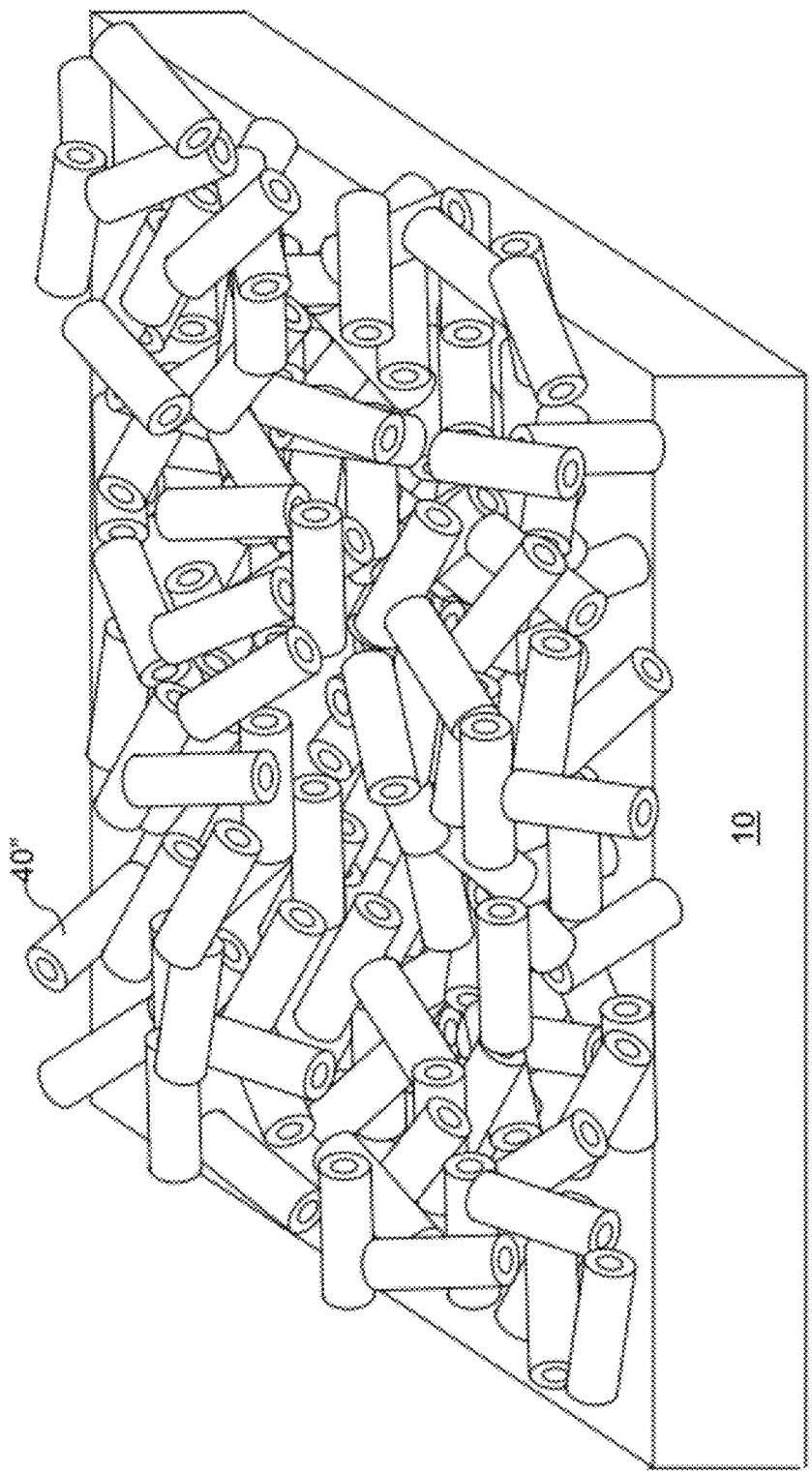
FIG. 19 is a bird's eye view of a random stack of pseudocapacitive nanocylinders on a conductive substrate that are obtained by removing the AAO substrate of FIG. 18 and letting pseudocapacitive nanocylinders fall on a conductive substrate.

Referring to FIG. 19, the assembly (20, 40') of the AAO substrate 20 and a plurality of pseudocapacitive nanocylinders 40" is placed on a conductive substrate 10 or a temporary substrate (not shown), and the AAO substrate 20 is removed employing the same removal process of the first embodiment corresponding to FIGS. 7 and 8. All pseudocapacitive nanocylinders 40" are detached from one another as the AAO substrate 20 is etched away, and fall down on the conductive substrate 10 or on the temporary substrate.

As the pseudocapacitive nanocylinders 40" fall down, the orientations of the pseudocapacitive nanocylinders 40" become "randomized," i.e., the orientations become "random." As used herein, "random" orientations or "randomized" orientations refer to a lack of alignment among elements, and includes geometries that include a short range order or an accidental long range trend. For example, the orientations of the pseudocapacitive nanocylinders 40" are considered "random" even if a particular orientation has a higher probability of occurrence, for example, due to tilting of the conductive substrate 10 or the temporary substrate during the etch process to induce a fall in a preferred orientation because the process of falling inherently introduces uncertainty in the final orientation of each pseudocapacitive nanocylinders 40".

The plurality of pseudocapacitive nanocylinders 40" may be affixed to the conductive substrate 10, for example, employing a thin layer of conductive adhesive. If a temporary substrate is employed, the plurality of pseudocapacitive nanocylinders 40" can be poured onto a conductive substrate 10 coated with a thin layer of conductive adhesive so that the plurality of pseudocapacitive nanocylinders 40" is affixed to the conductive substrate. The orientations the plurality of pseudocapacitive nanocylinders 40" are randomized upon placement on the conductive substrate 10 either by directly falling onto the conductive substrate 10 or by falling on a temporary substrate and subsequently being poured onto the conductive substrate 10.

Each pseudocapacitive nanocylinder 40" includes a pseudocapacitive material and has a cavity 21' therein. Each pseudocapacitive nanocylinder 40" has two openings that are located at end portions of that pseudocapacitive nanocylinder 40'. Each opening is within an end surface of a pseudocapacitive nanocylinder 40". Each opening is contiguously connected to the cavity 21'. Thus, the cavity 21' in each pseudocapacitive nanocylinder 40" is not encapsulated by that pseudocapacitive nanocylinder 40".

The third exemplary structure can be employed as an electrode of an energy storage device. In this case, the electrode is a "randomized nanocylinder electrode" in which the orientations of the pseudocapacitive nanocylinder 40" are randomized in a two-dimensional plane parallel to the local portion of the conductive substrate 10. The electrode can be bent as needed along with the pseudocapacitive nanocylinder 40" therein. Optionally, appropriate functional groups can be coated employing the same methods as in the first and second embodiments.

Figure 20:
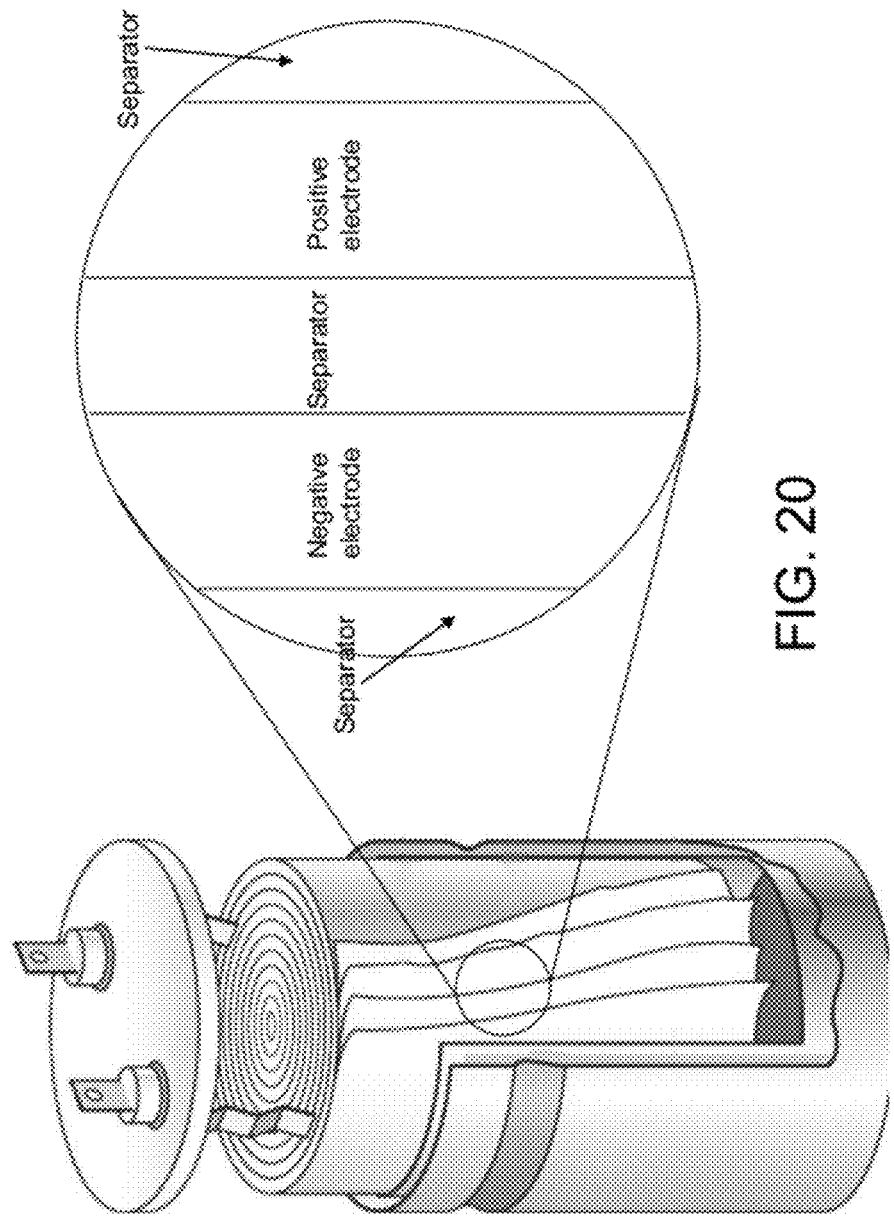
FIG. 20 is a schematic view of an energy storage device employing pseudocapacitive nanocylinders.

Referring to FIG. 20, an exemplary energy storage device employing pseudocapacitive nanocylinders is schematically illustrated. The exemplary energy storage device includes a first electrode that employs one of the first, second, and third exemplary structures described above. The exemplary energy storage device includes a second electrode that does not contact the first electrode. The second electrode includes an electrically conductive material such as porous activated carbon or a nanostructured material that is not a pseudocapacitive material. The exemplary energy storage device further includes a separator, which is a membrane that is ionically conductive but is a barrier to electrons. To reiterate, ions move through the separator under applied electrical bias across the first electrode and the second electrode. However, the separator prevents movement of electrons therethrough. In one embodiment, a robust paper may be used for the separator. The robust paper is an electron insulator, but becomes ionically conductive when saturated with electrolyte. An electrolyte solution is provided between the first and second electrodes such that the separator is embedded in the electrolyte solution.

The unique structures and processes described above can be employed to provide an ultracapacitor electrode that could double or triple the energy density presently achievable, and replace lead-acid battery technology in a host of applications such as automotive batteries and backup batteries in telecommunications. The disclosed electrodes employing pseudocapacitive nanocylinders can achieve similar energy densities as, but also enables charge/discharge cycling life that is 100-1000 times that of a typical battery.

While the disclosure has been described in terms of specific embodiments, it is evident in view of the foregoing description that numerous alternatives, modifications and variations will be apparent to those skilled in the art. Accordingly, the disclosure is intended to encompass all such alternatives, modifications and variations which fall within the scope and spirit of the disclosure and the following claims.

What is claimed is:

1. An energy storage device comprising an electrode, said electrode comprising a plurality of pseudocapacitive nanocylinders located on a conductive substrate, wherein each pseudocapacitive nanocylinder comprises a pseudocapacitive material and has a cavity therein,
   wherein sidewalls of said plurality of pseudocapacitive nanocylinders are perpendicular to a surface of said conductive substrate,
   wherein each of said plurality of capacitive nanocylinders is contiguously connected to one another through a planar pseudocapacitive material layer at an end of each capacitive nanocylinder,
   wherein said planar pseudocapacitive material layer has at least as many number of holes therein as a total number of pseudocapacitive nanocylinders among said plurality of pseudocapacitive nanocylinders.

2. The energy storage device of claim 1, wherein no pseudocapacitive material is present within said cavity.

3. The energy storage device of claim 1, wherein said cavity in each pseudocapacitive nanocylinder is not encapsulated by that pseudocapacitive nanocylinder.

4. The energy storage device of claim 1, wherein each pseudocapacitive nanocylinder has an opening at one end thereof, wherein said opening is contiguously connected to said cavity.

5. The energy storage device of claim 1, wherein sidewalls of said plurality of pseudocapacitive nanocylinders are perpendicular to a surface of said conductive substrate.

6. The energy storage device of claim 1, wherein said pseudocapacitive material is selected from manganese oxide, ruthenium oxide, nickel oxide, and a combination thereof.

7. The energy storage device of claim 1, further comprising another electrode that does not contact said electrode and including an electrically conductive material.

8. The energy storage device of claim 7, further comprising:
    an electrolyte solution located between said electrode and said other electrode; and
    a separator embedded in said electrolyte solution, wherein ions move through the separator under applied electrical bias across said electrode and said other electrode, and said separator prevents movement of electrons therethrough.

9. The energy storage device of claim 1, wherein said plurality of pseudocapacitive nanocylinders is coated with a functional group that is a pseudocapacitive material.

10. An energy storage device comprising an electrode, said electrode comprising a plurality of pseudocapacitive nanocylinders located on a conductive substrate, wherein each pseudocapacitive nanocylinder comprises a pseudocapacitive material and surrounds no more than a single cavity, said single cavity having only one opening, and an end cap portion of said each pseudocapacitive nanocylinder that does not include any hole therein is located at an opposite end of said only one opening, wherein each pseudocapacitive nanocylinder is connected to a planar pseudocapacitive material layer having at least as many number of holes therein as a total number of pseudocapacitive nanocylinders among said plurality of pseudocapacitive nanocylinders.

11. The energy storage device of claim 10, wherein no pseudocapacitive material is present within said cavity.

12. The energy storage device of claim 10, wherein each pseudocapacitive nanocylinder has an opening at one end thereof, wherein said opening is contiguously connected to said cavity.

13. The energy storage device of claim 10, wherein each pseudocapacitive nanocylinder has an end cap portion that does not include a hole therein and has an outer end surface that is contiguously connected to an entire periphery of sidewalls of that pseudocapacitive nanocylinder.

14. The energy storage device of claim 13, wherein an entirety of said outer end surface contacts said conductive substrate.

15. The energy storage device of claim 13 wherein each pseudocapacitive nanocylinder is laterally spaced from, and does not contact, any other of said plurality of capacitive nanocylinders.

16. The energy storage device of claim 13, wherein each of said plurality of capacitive nanocylinders is contiguously connected to one another through a planar pseudocapacitive material layer at an end of each capacitive nanocylinder.

17. The energy storage device of claim 10, wherein said pseudocapacitive material is selected from manganese oxide, ruthenium oxide, nickel oxide, and a combination thereof.

18. The energy storage device of claim 10, further comprising another electrode that does not contact said electrode and including an electrically conductive material.

19. The energy storage device of claim 18, further comprising:
    an electrolyte solution located between said electrode and said other electrode; and
    a separator embedded in said electrolyte solution, wherein ions move through the separator under applied electrical bias across said electrode and said other electrode, and said separator prevents movement of electrons therethrough.

20. The energy storage device of claim 10, wherein said plurality of pseudocapacitive nanocylinders is coated with a functional group that is a pseudocapacitive material.

* * * * *